F. C. B. PAGE.
GYROSCOPE.
APPLICATION FILED MAY 4, 1917.
1,294,697.
Patented Feb. 18, 1919.
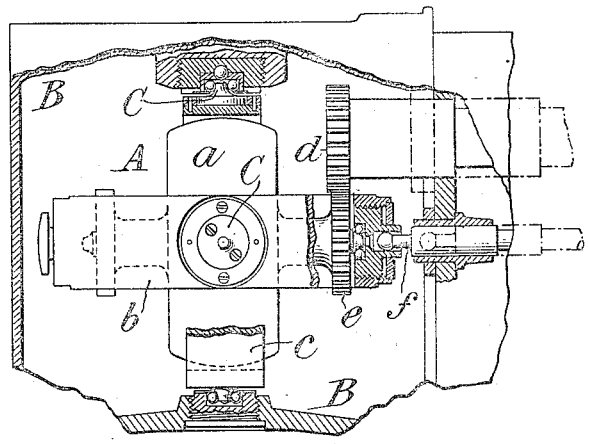
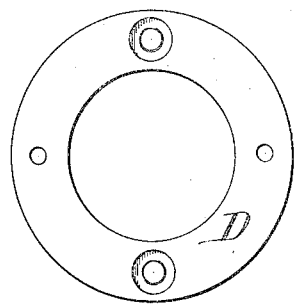
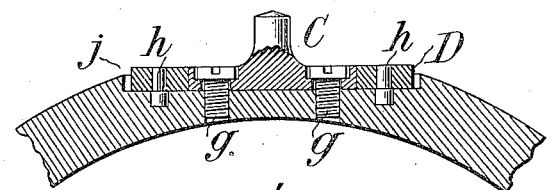
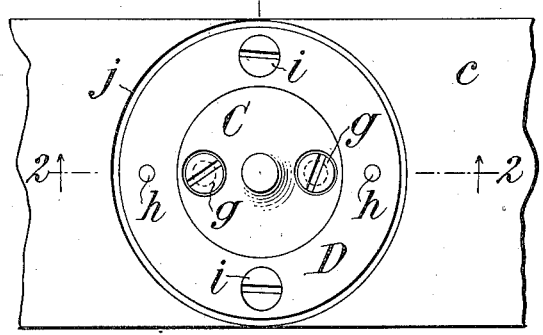
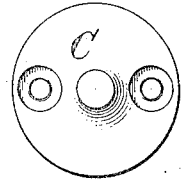
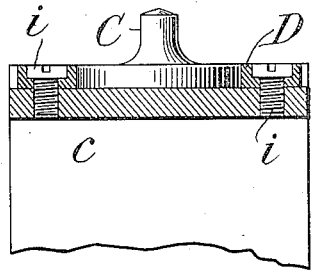
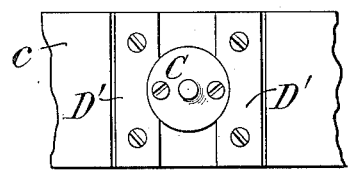
WITNESSES:
René Bruine
Burton F. Vaughan
INVENTOR
Frank C. B. Page,
By Attorneys,
Fraser, Dunk & Myers

UNITED STATES PATENT OFFICE.

FRANK C. B. PAGE, OF BROOKLYN, NEW YORK, ASSIGNOR TO E. W. BLISS COMPANY, OF BROOKLYN, NEW YORK, A CORPORATION OF WEST VIRGINIA.

GYROSCOPE.

1,294,697.      Specification of Letters Patent.      Patented Feb. 18, 1919.

Application filed May 4, 1917. Serial No. 166,330.

*To all whom it may concern:*

Be it known that I, FRANK C. B. PAGE, a citizen of the United States of America, residing in the borough of Brooklyn, county of Kings, city and State of New York, have invented certain new and useful Improvements in Gyroscopes, of which the following is a specification.

This invention relates to gyroscopes such, for example, as those used in steering mechanisms of automobile torpedoes. The improvement to be described is applicable to gyroscopes generally.

In the fitting and mounting of gyroscope rings some difficulty is experienced in precisely centering the pivots, which require to be centered with great accuracy. The present invention is designed to facilitate this operation.

The invention is illustrated in the accompanying drawings, in which,—

Figure 1 is an elevation of a gyroscope partly broken away, in section;

Fig. 2 is a fragmentary mid-section through one of the rings adjacent to its pivot, on the line 2—2 in Fig. 3;

Fig. 3 is a plan or elevation of the pivotal portion of one of the rings;

Fig. 4 is a transverse section on the line 4—4 in Fig. 3;

Fig. 5 is a plan of the centering ring, and

Fig. 6 is a plan of the pivot.

Fig. 7 is a plan of the pivotal portion of one of the rings, showing a modified construction.

In Fig. 1 the gyroscope A is shown inclosed in a shell or casing B which is built up, as usual, of several members and which includes pivotal bearings for the outer ring of the gyroscope whereby this ring is hung on a vertical axis. The gyroscope comprises a fly-wheel $a$, an inner ring $b$, and an outer ring $c$, all of the usual construction except for the pivotal feature to be described. Fig. 1 shows a part of the spinning mechanism comprising a pinion $d$ on a driving shaft which meshes with the pinion $e$ on the fly-wheel spindle; after the spinning-up operation the pinion $d$ and parts connected therewith are displaced to the position shown in dotted lines, where they are out of the way of the gyroscope rings. This figure also shows a bolt $f$ for holding the gyroscope locked during the spinning-up operation, and which at the end thereof is withdrawn to the position shown in dotted lines.

It is understood that in such gyroscopes the fly-wheel spindle is pivoted on a normally horizontal axis in the inner ring $b$; this ring is pivoted upon a horizontal axis at right angles to the first, but in the outer ring $c$; and this outer ring is pivoted upon a vertical axis at right angles to both the preceding, to the gyroscope support. The several pivots turn preferably in ball bearings, of which those shown in section in Fig. 1 are examples.

The pivotal construction commonly comprises a center piece or pivot C which consists of a pivot pin and a base or disk, this piece being commonly of hardened steel. This pivot is fastened by screws to the gimbal ring. The pivotal axis should precisely intersect the center of gravity of the ring, and the ring should be exactly symmetrical on both sides of its medial plane coinciding with the pivotal axis. To attain these results it is desirable to have some slight latitude for adjustment in order that if the pivot is not located with precise accuracy at the first attempt it may be re-located to bring it to its exact position. This might be accomplished by means of screws passing through holes somewhat larger than the screws so as to permit of the loosening of the screws and the readjustment of the pivot; unless such a construction would involve the liability that the screws might loosen in time and the pivot become thereby misplaced, so as to throw the ring out of balance.

To facilitate the proper adjustment and avoid any possibility of subsequent loss of adjustment is the purpose of the present invention. The pivot C is shown in Figs. 2 and 3 as applied to the gimbal ring $c$ (or equally to the ring $b$) by screws $g$, $g$ passing through holes (preferably countersunk) somewhat larger than the screws, so as to permit of the requisite latitude of adjustment. When this adjustment has once been satisfactorily attained it is desirable to make it final, so that if necessary the pivot might be removed and replaced without losing its proper concentric relation with the ring. For this purpose a locating member or centering ring D is applied around the base of the pivot. This ring D is in the shape of a flat washer with its inner margin forming a close and accurate fit with the periphery of the base of the pivot. The ring D is not applied until after the pivot has been finally located. This having been accomplished, the ring D is put in place and holes are drilled for two pins $h$, $h$ which are made a close fit with their holes, and the ring D is then fastened to the gimbal ring by means of screws $i$, $i$ or any other suitable fasteners. The pins $h$ are made slightly larger beneath the ring, this enlarged portion forming a head which prevents the escape of the pins even if not made a driving fit. After the ring D is thus once located and fastened securely in place, it is possible to remove the pivot screws $g$, $g$ and take off the pivot and replace it, with the assurance that it will return accurately to its precise centered position.

It is preferable to form a flat face upon the gimbal ring to form a base for the pivot disk and the ring D. This flat face may well be formed as a recess, as shown in Fig. 2, its marginal wall $j$ being sufficiently far from the outer edge of the ring D to afford the necessary latitude of adjustment in the original location of the pivot C.

The construction thus described in detail and shown with reference to the upper pivot of the outer gimbal $c$ is equally applicable to the lower pivot thereof and to the two pivots of the inner ring $b$, one of the latter being shown in Fig. 1. The locating member D does not essentially require to be formed as an integral piece or annulus, but may be subdivided into parts or elements which collectively serve as a locating piece, each being independently pinned or otherwise non-adjustably fastened to the gimbal ring, any such construction being an equivalent of the annular piece or ring D. An example is shown in Fig. 7, where the base of the pivot C is engaged by two segments D′, each separately pinned to the gimbal ring and which collectively serve for locating the pivot to the same effect as in the construction first described.

In its specific application the construction may be modified according to the particular type or construction of gyroscope to which it is applied.

I claim as my invention:—

1. In a gyroscope, a gimbal ring having a pivot fastened adjustably thereto, and a locating member closely engaging the pivot to prevent displacement of the latter after adjustment and fastened non-adjustably to the gimbal ring.

2. In a gyroscope, a gimbal ring having a pivot fastened adjustably thereto, and a locating ring closely embracing the pivot and fastened non-adjustably to the gimbal ring.

In witness whereof, I have hereunto signed my name.

FRANK C. B. PAGE.

Witnesses:
JOHN D. McINTYRE,
F. WAKEFIELD.